March 10, 1931. J. W. RATZ 1,796,047
DOMESTIC HEATER
Filed March 30, 1929
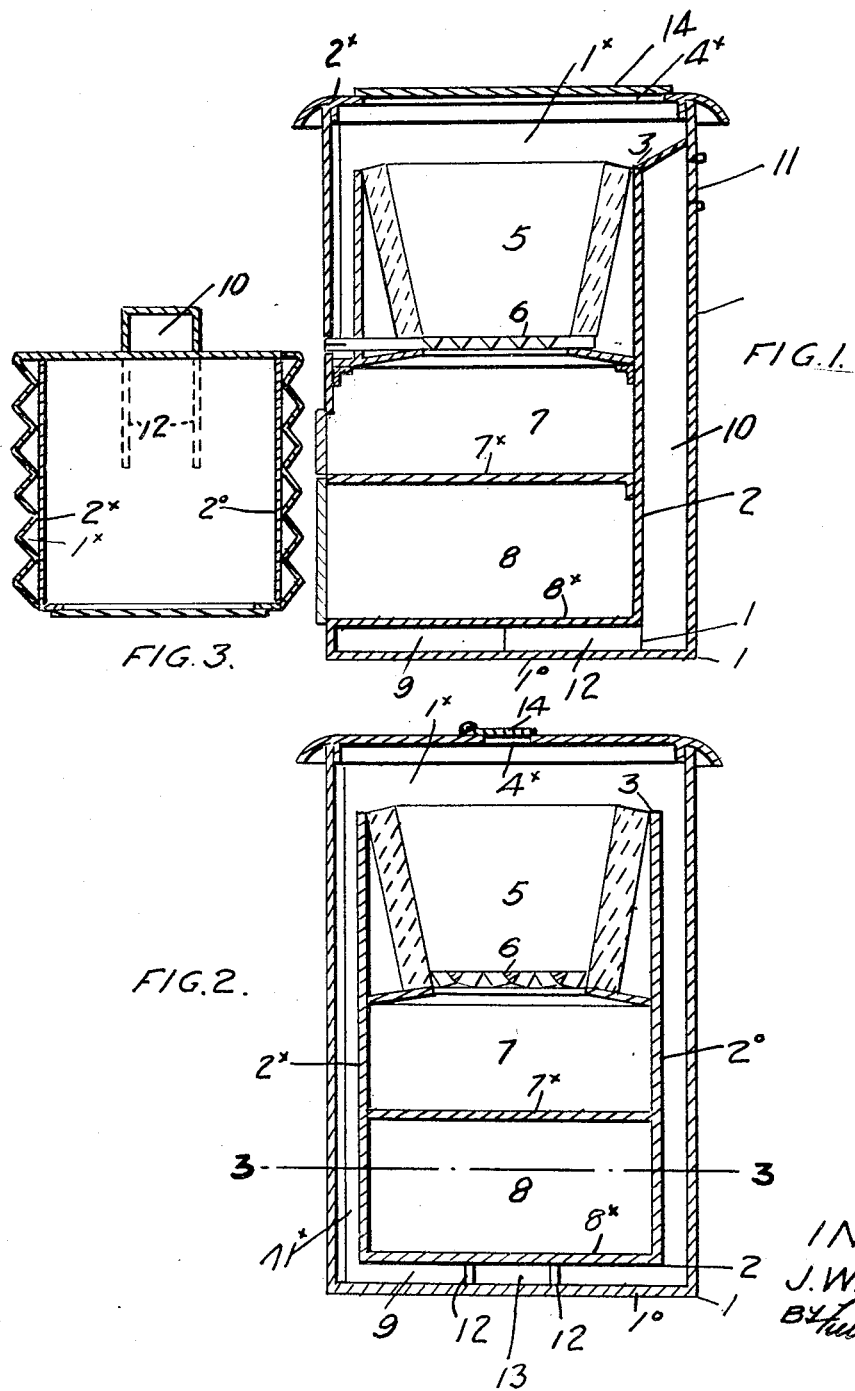
INVENTOR
J. W. RATZ.
BY [signature]
ATTORNEYS.

Patented Mar. 10, 1931

1,796,047

UNITED STATES PATENT OFFICE

JOHN WILLIAM RATZ, OF PRESTON, ONTARIO, CANADA

DOMESTIC HEATER

Application filed March 30, 1929. Serial No. 351,159.

My invention relates to improvements in domestic heaters, and the object of the invention is to devise a heater in which the hot gases passing off from the fire bed will be brought into direct contact with the entire surface of the outer walls of the heater so as to radiate a maximum amount of heat therefrom and at the same time utilize such heat in its travel, for heating an oven located beneath the fire pot and ash pit of the heater, and it consists essentially of the arrangement and construction of parts as hereinafter more particularly explained.

Fig. 1 is a vertical sectional view through my heater and extending from back to front of the heater.

Fig. 2 is a sectional view taken at right angles to the section shown in Fig. 1.

Fig. 3 is a plan sectional view on line 3—3, Fig. 2, on a slightly reduced scale.

In the drawings like characters of reference indicate corresponding parts in each figure.

1 indicates the outer casing, the side walls of which are formed corrugated as indicated at $1^x$ in Fig. 3. 2 is an inner casing which is supported within the outer casing and spaced apart from the bottom $1^o$ of the outer casing, as clearly indicated in Figs. 1 and 2. The side walls of the inner casing $2^x$ and $2^o$ preferably fit against the inner portions of the corrugation $1^x$, thereby forming vertical ducts through which the hot gases travel, and thereby holding such gases in close contact with the walls of the casing to distribute such hot gases equally over the surface of the outer casing so that the heat radiating therefrom is equalized, and thereby utilizing a maximum amount of radiating surface.

The inner casing 2 is provided with an open top 3 located beneath the closed top 4 of the outer casing. 5 is a fire pot supported in the inner casing 3, such fire pot being provided with any suitable form of grate 6, supporting the fire bed. The fire pot is located in the upper portion of the inner casing 3, and immediately below the fire pot 5 and grate 6 is located a chamber 7 forming an ash pit.

8 is a chamber located immediately below the ash pit 7, the bottom wall $7^x$ of such ash pit forming the top wall of the chamber 8, which chamber 8 is utilized as an oven. The bottom wall $8^x$ of the oven 8 also forms the bottom wall of the inner casing 2, the bottom wall $8^x$ being spaced from the bottom wall $1^o$ so as to form an interposed duct 9. 10 is the back duct of the heater leading to the chimney opening 11.

12 are baffle plates extending from each side of the opening 13, communicating between the duct 9 and the chimney duct 10. $4^x$ is a slotted opening formed in the closed top 4 of the outer casing 1. Such slotted opening is provided with a damper plate 14 which is preferably hinged as indicated in Fig. 2, such damper plate being opened or closed to any desired extent to control the amount of cold air entering into the heater. When in operation the damper plate 14 is opened, air passing through the slotted opening $4^x$ onto the top of the fire bed, such air is heated and then passes over the upper edges of the walls of the inner casing 3, passing down the ducts $1^x$ formed by the corrugated side walls of the outer casing but passing therefrom into the duct 9 and from thence between the baffle plates 12, through the opening 13 and up the chimney duct 10 to the chimney opening 11.

By this means it will be seen that not only is a maximum radiating surface provided for heating the room or apartment in which the heater is located, but the hot gases are also utilized to heat the oven as such gases pass to the chimney outlet. From this description it will be seen that I have devised a very simple construction of heater which will have a maximum efficiency not only as a room heater but also form a heater in which an oven may be incorporated and the hot gases also utilized for heating such oven.

What I claim as my invention is:—

A domestic heater comprising an outer casing having an air supply opening in the top thereof and having a chimney outlet in the back wall and provided with an inner chamber supported within the outer casing and spaced from the bottom thereof open at the top and spaced from the side walls of the casing to form ducts on each side thereof, corrugations formed in the side walls of the outer casing to divide the side ducts into a plurality of channels, a separated duct leading from the bottom of the outer casing to the chimney outlet whereby cold air is fed on to the top of the fuel bed, heated and passed down the channel corrugations on each side of the inner chamber into the interspace beneath the same to pass to the duct leading to the chimney outlet.

JOHN WILLIAM RATZ.